United States Patent [19]

Maimoni

[11] Patent Number: 4,735,872
[45] Date of Patent: Apr. 5, 1988

[54] ELECTROCHEMICAL SYSTEM INCLUDING LAMELLA SETTLER CRYSTALLIZER

[75] Inventor: Arturo Maimoni, Orinda, Calif.

[73] Assignee: The United States of America as represented by the United States Department of Energy, Washington, D.C.

[21] Appl. No.: 931,825

[22] Filed: Nov. 18, 1986

[51] Int. Cl.$^4$ ........................................... H01M 12/06
[52] U.S. Cl. ...................................... 429/27; 429/14; 429/70; 429/72; 429/26; 210/521
[58] Field of Search .................... 429/14, 17, 27, 26, 429/51, 70, 72; 422/252, 245; 210/521

[56] References Cited

U.S. PATENT DOCUMENTS

| 1,091,721 | 3/1914 | Weil | 422/252 |
|---|---|---|---|
| 1,478,337 | 12/1923 | Issachsen | 422/252 X |
| 1,560,473 | 11/1925 | Howard | 422/252 |
| 1,892,760 | 1/1933 | Burnham | 422/252 |
| 3,359,136 | 12/1967 | Merten et al. | 429/80 |
| 3,527,617 | 9/1970 | Prober | 429/15 |
| 3,708,345 | 1/1973 | Loos et al. | 429/27 |
| 4,101,717 | 7/1978 | Durand | 429/15 |
| 4,151,084 | 4/1979 | Probstein et al. | 210/97 |
| 4,246,324 | 1/1981 | de Nora et al. | 429/17 |
| 4,663,249 | 5/1987 | Gordon | 429/14 |

OTHER PUBLICATIONS

A. Maimoni, "Aluminum–Air Power Cell Research and Development Annual Report Summary, CY 1984," Lawrence Livermore National Laboratory, Livermore, Ca., UCID-20356, Feb. 1985.

A. Maimoni, "Aluminum–Air Power Cell: A Progress Report," Lawrence Livermore National Laboratory, UCRL-92281, Mar. 1985.

Extended Abstracts, vol. 85-2, No. 9, The Electrochemical Society, Oct. 13-18, 1985, pp. 17-18.

Conf.-851146-Absts., Extended Abstracts: Seventh Battery and Electrochemical Contractors' Conference, Nov. 18-21, 1985, "Aluminum–Air Research at LLNL", A. Maimoni et al, pp. 299-302.

Primary Examiner—Anthony Skapars
Attorney, Agent, or Firm—L. E. Carnahan; Roger S. Gaither; Judson R. Hightower

[57] ABSTRACT

A crystallizer which incorporates a lamella settler and which is particularly applicable for use in batteries and power cells for electric vehicles or stationary applications. The lamella settler can be utilized for coarse particle separation or for agglomeration, and is particularly applicable to aluminum-air batteries or power cells for solving the hydrargillite (aluminum-hydroxide) removal problems from such batteries. This invention provides the advantages of very low energy consumption, turbulence, shear, cost and maintenance. Thus, due to the low shear and low turbulence of this invention, it is particularly effective in the control of aluminum hydroxide particle size distribution in the various sections of an aluminum-air system, as will as in other elecrochemical systems requiring separation for phases of different densities.

11 Claims, 2 Drawing Sheets

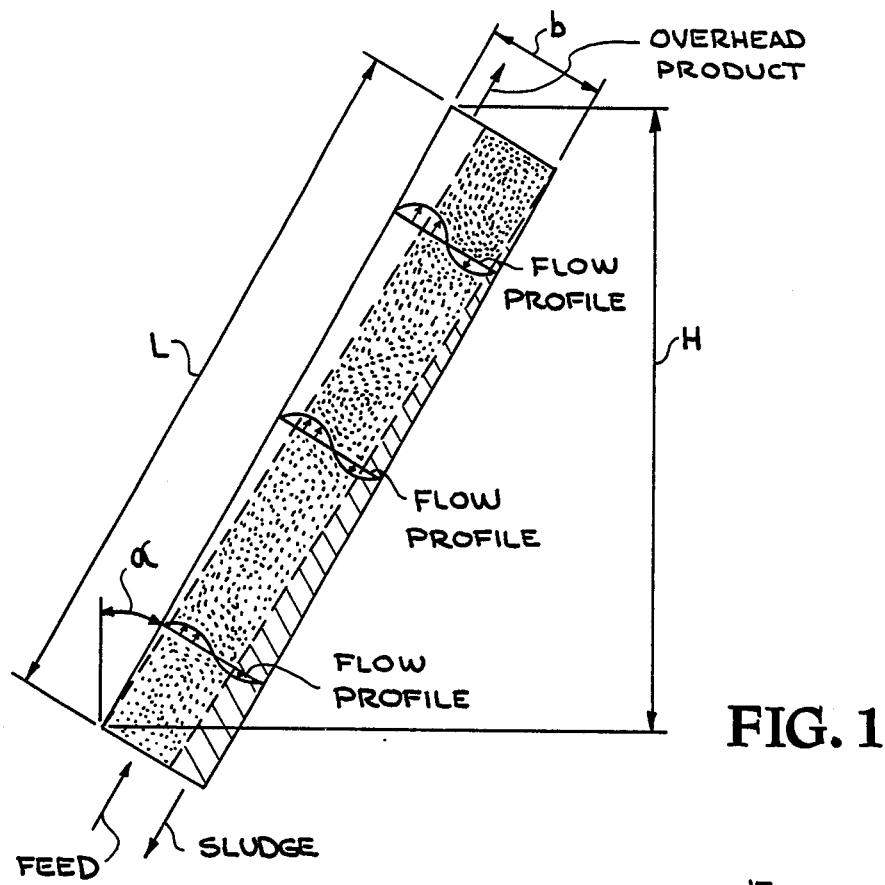
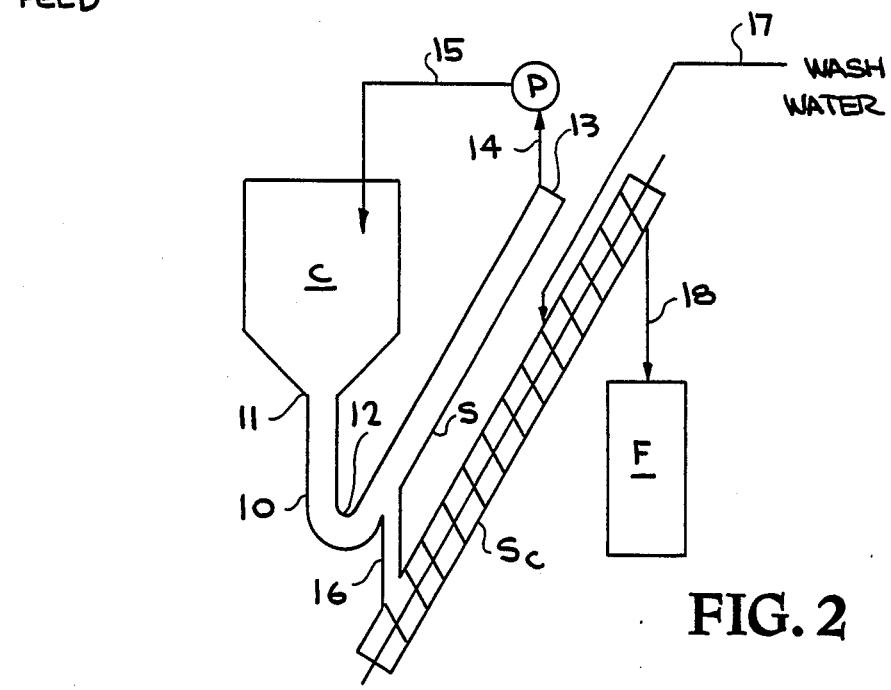
FIG. 1
FIG. 2

ELECTROCHEMICAL SYSTEM INCLUDING LAMELLA SETTLER CRYSTALLIZER

BACKGROUND OF THE INVENTION

The invention described herein arose in the course of, or under, Contract No. W-7405-ENG-48 awarded the University of California by the U.S. Department of Energy.

This invention pertains to the application of lamella (or tube) settlers to crystallizer design in general; in particular, application of settler to compact crystallizers such as used in advanced type batteries and power cells for electric vehicle or stationary applications, and more particularly to a new approach for solving the hydrargillite removal problem from aluminum-air batteries.

The beneficial effect on settling of suspensions by having inclined rather than vertical tubes is well known. In current practice, the inclined plate settlers, commonly known as lamella settlers, consist of parallel plates, usually arranged in a stacked array, which form channels into which a slurry is fed. Under the action of gravity, the solids deposit on the upper surface of the inclined plate at the bottom of each channel and flow to the dense slurry collector at the bottom of the settler. The clear liquid rides under the lower surface of the plate at the top of each channel and is collected at the top of the lamella settler.

Lamella settlers are very effective, low energy intensity sedimentation devices which are being extensively used in water treatment plants and some applications in the mining and minerals industry. Lamella settlers can be used in place of other commonly used separation devices, such as hydrocyclones, elutriators, thickeners, etc. While lamella settlers do not provide as sharp a separation of fine and coarse particles as hydrocyclones, when used as clarifiers they have a number of advantages over hydrocyclones, such as low energy consumption and low shear.

Lamella settlers are exemplified by U.S. Pat. No. 4,151,084 issued in April 1979 to R. F. Probstein et al, as well as by numerous publications, such as "Lamella and Tube Settlers. 1. Model and Operation", W. Leung et al, *Ind. Eng. Chem. Process Dev.*, 22, 58–67 (1983), and "The Sedimentation of Polydisperse Suspensions In Vessels Having Inclined Walls", R. H. Davis et al, *Int. J. Multiphase FLow*, 8(6), 571–585 (1982).

Crystallization is a well known technology and various types of crystallizers are known in the art. However, one of the aspects of crystallization, particularly when applied to small, compact systems, such as required for successful application of advanced batteries/power cells to electric vehicles, is the control of the particle size distribution of the crystals. Very fine particles are continuously being formed by breakage of larger crystals and by secondary nucleation; both of these are promoted by high shear conditions.

The control of fines is a general problem in industrial applications of crystallization. In industrial applications the control of fines is usually performed on a side stream containing only fine particles suspended in the mother liquor; the suspension is heated above the temperature required for complete solids dissolution, cooled and returned to the crystallizer. However, this means of fines control/removal is of limited applicability to compact, mobile systems; in the case of the aluminum-air power cell the solutions are highly supersaturated and heating to 150°–230° C. would be required for fines removal. The equipment required to obtain such heating and holding the suspension at elevated temperature and pressure would add a prohibitive penalty to the weight, volume and cost of such a power cell system.

Another way to remove the excess fine crystals is by agglomeration, a process where small crystals coalesce and are bonded together to form a larger agglomerate. Experimental work on agglomeration in suspension has pointed out the necessity for low shear in the agglomerating process; the initial agglomerates are very fragile and break-up very easily.

A problem arising in the design of electrochemical reactors involving suspended solids (or two liquid phases of different densities) is that there is a need to:
1. Maintain a low solids (or second phase) concentration in the cells.
2. Obtain efficient contacting between the two phases (solid-liquid or liquid-liquid) in a separate tank.
3. Minimize energy consumption in all auxiliary devices.

Thus, separation devices of some sort are required. An additional problem in the aluminum-air and lithium-air battery is the removal of the reaction product from the system.

The prior development efforts of the aluminum-air power cell, for example, utilized hydrocyclones for the removal of most of the solids from the electrolyte flow returning to the cell stack and for coarse product removal. Such an arrangement utilizing cyclone separators is described and illustrated in document UCID-20356 entitled "Aluminum-Air Power Cell Research and Development Annual Report Summary, CY 1984", A. Maimoni, Feb. 27, 1985. However, as recognized in the art, cyclone type systems involve high shear effects and involve relatively high energy consumption, with the high shear adversely affecting crystal growth and agglomeration.

Thus, there is a need for an efficient, low shear, low energy consumption particle separation process. In addition, in aluminum-air batteries/power cells there is a need for an efficient and effective means for coarse product separation and removal, and to provide for crystal growth and agglomeration.

Therefore, it is an object of this invention to provide an apparatus for particle separation/crystallization which utilizes low shear and low energy consumption.

A further object of the invention is to provide a particle crystallization means which incorporates a lamella settler.

A further object of the invention is to provide a new approach for solving the hydrargillite removal problem from aluminum-air batteries.

A still further object of the invention is to provide an apparatus which combines lamella settlers and crystallizers for use in compact batteries and power cells for improved removal of reaction products.

Another object of the invention is to provide a lamella settler crystallizer, particularly adapted for use in electrochemical systems requiring separation of phases of different densities.

Another object of the invention is to provide an improved crystallizer for separation of solid reaction products from liquids which incorporates a lamella settler.

Another object of the invention is to provide a lamella settler crystallizer which operates in a low shear environment, minimizes breaking of crystals by abrasion, and is essential to the formation of agglomerates, while operating at low pumping costs.

Still another object of the invention is to provide a lamella settler crystallizer which is particularly adapted for aluminum-air batteries/power cells, and includes a mechanism for coarse product separation and removal while maintaining the coarse fraction of the crystal population within the crystallizer, and providing a dilute suspension of fine particles for return to the cell while retaining the particles in the agglomerating range in a low shear environment.

Other objects and advantages of the invention will become apparent to those skilled in the art from the following description and accompanying drawings.

SUMMARY OF THE INVENTION

The above objects of the invention are carried out by an apparatus, for carrying out a particle separation process, which utilizes a lamella settler and which operates at low shear with low energy consumption. The invention, which may be utilized in various particle separation applications, is particularly applicable to advanced type batteries and power cells for electric vehicles, etc., such as the aluminum-air, zinc/Redox, and lithium-air batteries. These types of batteries/power cells require crystallization of the reaction products for their normal operation, and thus compact crystallizers, such as provided by this invention, is essential to effective operation, due to its low shear and low energy consumption. The apparatus of this invention enables coarse particle separation and agglomeration.

The lamella settler crystallizer of this invention incorporates at least one lamella settler which is inclined at about 60° to the horizontal, and basically consists of a set of parallel plates or parallel tubes into which a slurry is fed to obtain gravitational separation, with the clarified liquid collecting under each of the plates and flows upward to the overflow, the solids settle and flow along the bottom of each late to be collected. In a crystallization context, lamella settlers produce low shear and low energy consumption, and the volume required for the lamella settler does not penalize the system, because the settler is an integral part of the crystallizer. Thus, crystal growth and agglomeration take place within the settler.

In an aluminum-air power cell, for example, the lamella settler crystallizer is connected to the electrolyte storage tank and has two distinct uses: (1) as a means of coarse product separation and removal, and (2) as a means for maintaining the coarse fraction of the crystal population within the crystallizer, providing a dilute suspension of fine particles for return to the storage tank of the cell and providing a mechanism for retaining the particles in the agglomerating range (0.5 to 30 micrometers) in a low shear environment. The crystallizer of this invention may include a pair of settlers connected in series, with the later settler being connected to a coarse product conveyor and storage arrangement, while the fine particles are returned to the electrolyte storage tank. Thus, the invention provides a new approach for solving the hydrargillite removal problem form aluminum-air batteries/power cells, for example, although it is applicable to other power cells or batteries requiring similar solids removal, as well as other crystallization and particle separation applications.

BRIEF DESCRIPTION OF THE DRAWINGS

FIG. 1 is a schematic of a lamella settler illustrating the flow paths therethrough;

FIG. 2 schematically illustrates an embodiment of the invention for coarse particle separation.

DETAILED DESCRIPTION OF THE INVENTION

Figure 3:
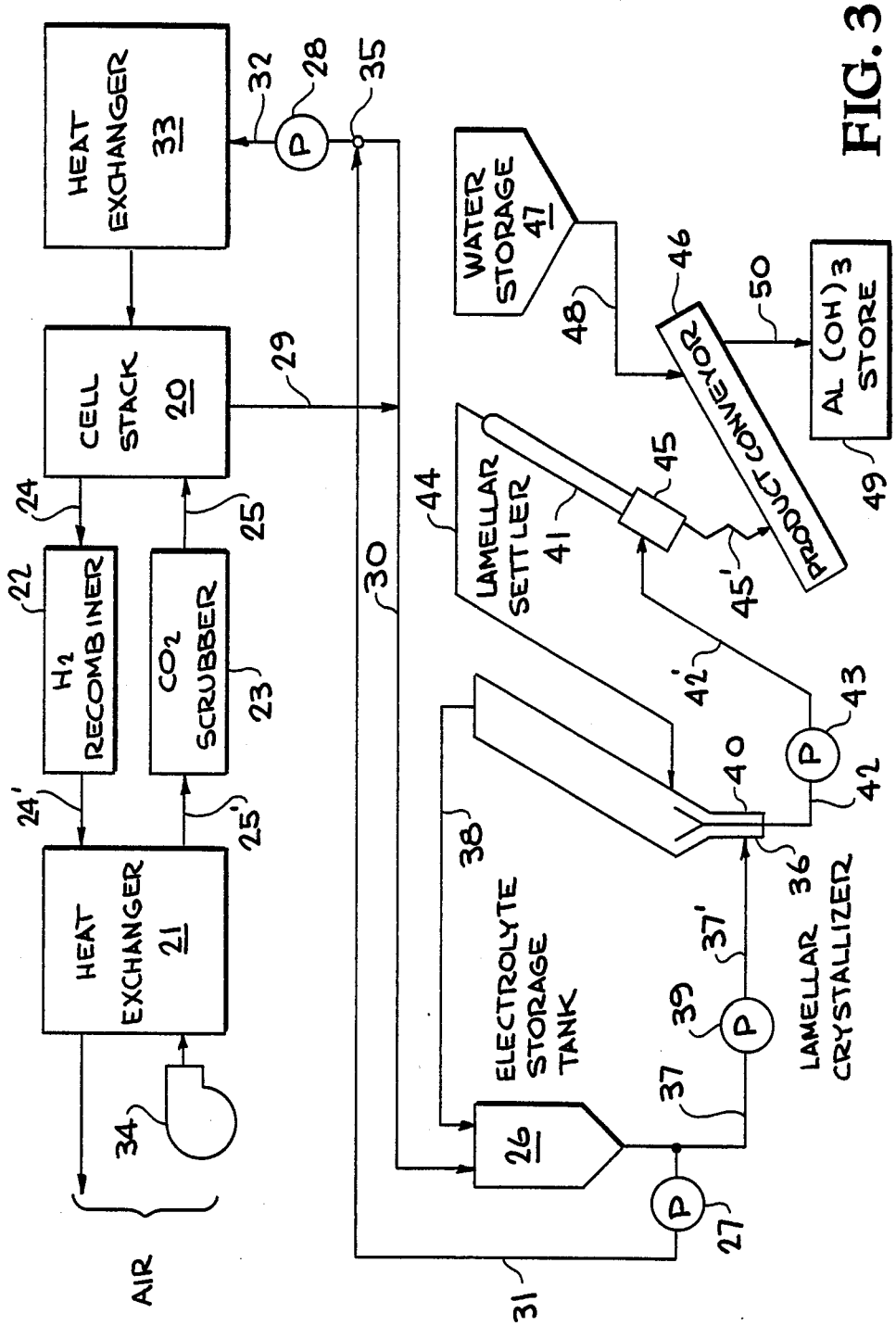
FIG. 3 illustrates an aluminum-air power cell incorporating the invention.

The present invention is directed to a lamella settler crystallizer for crystallization and particle separation. The invention is particularly useful for coarse product removal and as a low shear agglomeration/separation device. The invention has particular application to systems which require crystallization of the reaction products for their normal operation, such as advanced batteries/power cells, exemplified by the aluminum-air, zinc/Redox, and lithium-air batteries.

Due to the low shear, low energy consumption of the lamella settler crystallizer of this invention it is particularly applicable to aluminum-air batteries, and provides: (1) a means of coarse product separation and removal, and (2) a means for maintaining the coarse fraction of the crystal population within the crystallizer, providing a dilute suspension of fine particles for return to the cell and providing a mechanism for retaining the particles in the agglomerating range (0.5 to 30 micrometers). This is particularly beneficial in the agglomeration of hydrargillite (aluminum-hydroxide) particles.

Where separation afforded by gravity alone, using an inclined lamella settler crystallizer, is not enough, a vertical or near vertical lamella settler section may be rotated around an axis (such as a cylindrical section rotating around a vertical axis), and differs from a conventional centrifuge due to a much lower rotation speed.

While the following description of the lamella settler crystallizer of this invention will be directed to its application to aluminum-air power cells/batteries, such is not intended to limit it to this application. The invention can be utilized in other types of power cells/batteries or electrochemical systems requiring similar solids removal, as well as in other types of crystallization and particle separation applications. The invention is particularly applicable to particle separation systems where low shear and/or low energy consumption are required for efficient operation of the separation process.

A. Lamella Settlers:

As pointed out above, the beneficial effects of settling of suspensions on an inclined lamella settler, such as illustrated in FIG. 1 are well known. In current practice the lamella settler utilizes inclined parallel plates or parallel tubes, arranged as a stacked array, which form channels into which slurry is fed. Under the action of gravity the solids deposit on the upper surface of the inclined plates at the bottom of each channel and flow to the dense slurry collector at the bottom (see FIG. 1). The clear liquid rides under the lower surface of the plates at the top of each channel and is collected at the top of the lamella settler. Since lamella settlers, and their construction and operation, are well known, a detailed description and illustration of such is not deemed necessary for an understanding of the basic operational characteristics of a lamella settler in this invention.

The flow rate of clarified product from the lamella settler of FIG. 1 is approximately given by:

$$S(t) = (v_o b / \cos \alpha)[1 + (H/b)\sin \alpha]$$

where:
- $S(t)$ = volumeric rate of production of clarified fluid per unit depth in the third dimension of the vessel; cm³/sec/cm,
- $v_o$ = vertical settling rate of the particles (i.e., the settling rate in a vertical vessel); cm/sec,
- $\alpha$ = angle of inclination of the plates with respect to the vertical,
- b = spacing between plates; cm,
- H = vertical height of the suspension; cm.

The concentration of solids present in the clarified product is a function of the particle size distribution of solids in the feed and of the flow rate of clarified products. It has also been found that lamella settlers provide advantages in the context of crystallization:

(a) low shear environment, which minimizes breaking of crystals by abrasion and is essential to the formation of agglomerates;

(b) low pumping costs, since the main contributor to the pressure drop is the hydrostatic head of the fluid being pumped;

(c) relative to vertical settling, provide large settling enhancement factors (about 25/1) and low volume and weight requirements; and (d) simplicity and low cost.

However, lamella settlers do require more volume than energy intensive devices, such as hydrocyclones, centrifuges, etc.

B. Crystallization:

One of the key aspects of crystallization, particularly when applied to small, compact systems, such as required for successful application of advanced batteries/power cells to electric vehicles, is the control of the particle size distribution of crystals. Very fine particles are continuously being formed by breakage of larger crystals and by nucleation. Crystal breakage is promoted by existence of high shear conditions; in the case of the aluminum-air systems, it has been found that the shear produced by centrifugal pumps, hydrocyclones used for fines separation; etc., lead to breakage of large particles and inhibit the agglomeration process. In the aluminum-air power cell the fine crystals have to grow to a minimum size (at least 20 micrometer) before removal from the system; in others, such as the zinc/Redox system, control of the population of very fine crystals is required to maintain the desired properties in the slurry circulating to the electrodes.

The control of fines, as pointed out above, is a general problem in industrial applications of crystallization. In industrial applications the control of fines is usually performed on a side stream containing only fine particles suspended in the mother liquor; the suspension is heated above the temperature required for complete solids dissolution, cooled and returned to the crystallizer. However, this means of fines control/removal is of limited applicability to compact, mobile systems; in the case of the aluminum-air power cell the solutions are highly supersaturated and heating to 150°–230° C. would be required for fines removal. The equipment required to obtain such heating and holding the suspension at elevated temperature and pressure would add a prohibitive penalty to the weight, volume and cost of the system.

As pointed out above, another way to remove the excess fine crystals is by agglomeration, a process where small crystals coalesce and are bonded together to form a larger agglomerate. Experimental work on agglomeration in suspension has pointed out the necessity for low shear in the agglomerating process; the initial agglomerates are very fragile and break-up very easily.

C. Application of Lamella Settlers to Crystallization:

The above sections (A and B) summarized the main processes operating in crystallization, operation of lamella settlers, and the reasons for needing efficient, low shear, low energy consumption particle separation process. In a crystallization context, the volume required for the lamella settler does not necessarily penalize the system, because the settler is an integral part of the crystallizer; crystal growth and agglomeration take place within the settler.

As applied to the aluminum-air system, there are two distinct uses for lamella settlers: (a) as a means of coarse product separation and removal, (b) as a means for maintaining the coarse fraction of the crystal population within the crystallizer, providing a dilute suspension of fine articles for return to the cell and providing a mechanism for retaining the particles in the agglomerating range (0.5 to 30 micrometers) in a low shear environment.

Examples of these applications are given below:

(a) Coarse particle separation:

An apparatus embodiment is shown schematically in FIG. 2, but it should not be construed as the only means of utilizing a lamella settler for coarse product removal. A pipe 10 at the bottom 11 of a crystallizer, C, is connected to a lower end 12 of a lamella settler, S. A slurry containing medium-sized particles flows to the top 13 of the settler S, where a pump, P, via pipes 14 and 15, returns it to the crystallizer C. Coarse product crystals flow down on a lower surface of end 12 of the settler S to a collection chamber or tube 16 which feeds a screw conveyor, SC, for example. Wash water indicated at 17 can be added at an intermediate location in the screw conveyor SC and the washed product passes into pipe 18 and is collected in a product container, F, with the wash water passing through tube 16 and into settler S for replenishing water used in the system. The effectiveness of washing of the product in conveyor SC and the tube 16 can be increased by using a zig-zag arrangement in tube 16 (similar to that of FIG. 3); the wash water flowing upwards through the falling particle at each corner of the zig-zag carries the fine particles upwards, thus producing a bottom product in which the coarse particles are more concentrated. Preliminary calculations indicate that a lamella settler (see FIG. 1) with H = 60 cm
b = 1 cm
$\alpha$ = 50° can separate 50 micrometer particles of aluminum hydroxide (hydrargillite) from supersaturated sodium aluminate solutions (density≃1.2 G/cm³, viscosity≃1.8 centipoise) containing 25 vol % solids at S = 2.2 cm³/sec/cm Industrial crystallizers often use an elutriation section at the bottom of the crystallizer; the lamella settler provides similar separation of the final product in a smaller volume.

(b) Agglomeration:

The application of lamella settlers to agglomeration will be illustrated in the context of the aluminum-air power cell system (see FIG. 3). Experimental work verifying this invention has demonstrated that particles smaller than 30 micrometer will agglomerate into the 30 micrometer range; the system also requires that the particle concentration in the electrolyte returning to the cell from the crystallizer be kept as low as practicable. The lamella settler/agglomerating section can be designed to retain particles in the range 10 to 30 micrometers; it is estimated that for the settler dimensions and suspension indicated above, a clarification rate of 0.15 $cm^3/sec/cm$ can be obtained.

FIG. 3, incorporates the invention into an aluminum-air power cell/battery system. The overall system of FIG. 3 is generally similar to the aluminum-air power cell illustrated and described in above-referenced report UCID-20356, except that the crystallizer and cyclones of the prior cell have been replaced by a lamella crystallizer arrangement in accordance with the present invention. The FIG. 3 embodiment incorporating the invention provides for the separation of the aluminum hydroxide (hydrargillite) reaction products from the electrolyte of aluminum-air batteries. In contrast to other compact particle separation devices, such as filters and hydrocylones, used for example in the power cell of above-referenced report UCID-20356, lamella settler crystallizers provide the following unique advantages: (1) very low energy consumption, (2) very low turbulence, (3) very low shear, and (4) very low cost and maintenance requirements. The low shear and low turbulence are essential to control the aluminum hydroxide particle size distribution in the various sections of the aluminum-air system. Low shear and low turbulence are required in aluminum-air systems, for example, to: (1) control the number of new fine crystals produced by secondary nucleation, and (2) agglomerate the fine particles into coarser aggregates. Agglomeration of the fine particles is essential to obtain small volume and small weight aluminum-air systems.

Referring now to FIG. 3, the aluminum-air power cell system illustrated therein comprises a cell stack 20, which may be of the type illustrated in FIG. 1 of above-referenced report UCID-20356, connected at one side to a heat exchanger 21 via an $H_2$ recombiner 22 and a $CO_2$ scrubber 23 through lines or pipes 24—24' and 25—25'. Cell stack 20 is connected at the opposite side to an electrolyte storage tank 26 via a pair of pumps 27 and 28 and interconnecting lines or pipes 29, 30, 31 and 32, with a heat exchanger 33 connected between line 32 and cell stack 20. An air pump 34 is connected to pump air through heat exchanger 21 and scrubber 23 to cell stack 20 via lines 25'—25, the air being discharged from cell stack 20 through recombiner 22 and heat exchanger 21 via lines 24—24' to atmosphere, as indicated by flow arrows, or for recirculation through the cell. Electrolyte from the lower end of storage tank 26 is pumped through line 31 by pump 27 into pump 28 and through line 32 and heat exchanger 33 into cell stack 20 for reaction in the cell stack as known in the art, after which the electrolyte discharges from cell stack 20 via line 30 which is connected to each of pump 28 and storage tank 26. Lines 31 and 30 meet at a junction 35 connected to the inlet of pump 28. A valve may be located at junction 35 to allow draining of electrolyte from the cell stack 20 during shut-down via lines 30 and 31.

An inclined lamella settler crystallizer 36 is connected to electrolyte storage tank 26 at the bottom or lower end thereof by pipes or lines 37—37' and at the top or upper end thereof by a pipe or line 38, with a pump 39 mounted between lines 37 and 37'. An inlet of pump 27 is also connected to line 37. Electrolyte discharged from cell stack 20 into storage tank 26 is then pumped via pump 39 through inclined lamella settler crystallizer 36, as indicated by flow arrows, wherein larger particles in the electrolyte are removed and/or the finer particles are agglomerated as described above. The larger particles under the action of gravity are collected in the lower end or collector section 40 of crystallizer 36, and the fine particles which remain in the electrolyte pass through the crystallizer and return to storage tank 26 via line 38. The small particles within the crystallizer 36 are allowed to agglomerate within the lamella settler arrangement due to the low shear environment of the crystallizer 36 as discussed above. In this embodiment, the lamella settler crystallizer 36 is positioned at an incline of 60° with respect to horizontal.

The larger particles of hydrargillite which settle into the collector or lower end 40 of crystallizer 36 are pumped with electrolyte, as indicated by flow arrows, to an inclined lamella settler 41 which is connected to crystallizer 36 via lines or pipes 42 and 42' between which is connected a pump 43, the electrolyte passing through settler 42 and is directed back into crystallizer 36 via a line or pipe 44 and at a point located above the lower end or collector section 40 of the crystallizer 36. Lamella settler 41, like crystallizer 36 is inclined at a 60° angle with respect to the horizontal. Hydrargillite is collected in lower end or collector section 45 of settler 41 and drops via a zig-zag pipe or tube 45' into a conveyor mechanism 46 as indicated by arrow. Due to the zig-zag of pipe or tube 45' this results in a collection of coarse or larger particles at the bottom of each section of the zig-zag with the fine particles being on the upper portion of each section. Wash water from a storage tank 47 passes through a line or pipe 48 onto conveyor mechanism 46, as indicated by flow arrow, and then passes up zig-zag tube 45' into settler 41 for replenishing the water in the system. After being washed, the hydrargillite ($Al(OH)_3$) is collected in a storage tank or container 49 as indicated by arrow 50. Zig-zag pipe 45' enhances the effectiveness of the wash/product separating operation. Thus, the electrolyte discharged from the cell stack 20 is circulated through lamella settler crystallizer 36 and lamella settler 41, wherein the larger particles or reaction products are removed from the electrolyte, and the small or fine particles are allowed to crystallize in the low shear environment of the crystallizer 36.

The electrochemical system of FIG. 3 may include a reaction chamber associated with electrolyte storage tank 26 (the reaction being in the circulation of the electrolyte through the system), and the tank 26 may be broadly considered as a storage/reaction chamber.

It has thus been shown that the invention provides an improved crystallizer and particle separation apparatus, as well as a new approach for solving the hydrargillite (aluminum hydroxide) removal problem from aluminum-air batteries. Again, while the invention has been illustrated and described relative to aluminum-air systems, the invention can be used in other electrochemical systems requiring separation of phases of different densities, such as lithiu hydroxide of the lithium-air battery, the zinc ferricyanide and some versions of the zinc-air battery, as well as other crystallization and particle separation applications.

While embodiments incorporating the invention have been illustrated and described, modifications and changes will become apparent to those skilled in the art, and it is intended to cover in the appended claims all such modification and changes as come with the scope of the appended claims.

What is claimed is:

1. In an electrochemical system including a cell stack, an electrolyte storage/reaction chamber means, means for circulating electrolyte from said storage/reaction chamber means, through said cell stack, and back to said storage/reaction chamber means, and means for removing solid reaction products produced in said cell stack from the electrolyte, the improvement comprising:

said means for removing solid reaction products comprising:
a lamella settler crystallizer operatively connected to said electrolyte storage/reaction chamber means, said crystallizer being positioned at an angle with respect to horizontal;
means for circulating electrolyte from said storage/reaction chamber means, through said crystallizer, and back to said storage/reaction chamber means; and
means operatively connected to said crystallizer for collecting products separated from the electrolyte as it passes through said crystallizer.

2. The improvement of claim 1, wherein said last-mentioned means includes a lamella settler positioned at an angle with respect to horizontal and operatively connected to said crystallizer and to a product conveyor, and a product storage means operatively connected to said lamella settler.

3. The improvement of claim 2, wherein said lamella settler is in fluid connection at a lower end thereof to a lower end of said crystallizer and in fluid connection at an upper end thereof to said crystallizer, said settler including a collector section at said lower end thereof; and means for circulating a portion of the electrolyte passing through said crystallizer through said settler; said product conveyor being operatively connected to said collector section of said settler, and said product storage means being operatively connected to said conveyor.

4. The improvement of claim 3, additionally including washing means operatively connected to said product conveyor for washing products thereon.

5. The improvement of claim 4, wherein said crystallizer and said lamella settler are inclined at an angle of about 60° with respect to horizontal.

6. The improvement of claim 3, wherein said crystallizer includes a collector section located at said lower end thereof, wherein said lower end of said lamella settler is in fluid connection with collector section of said crystallizer, and wherein said upper end of said lamella settler is in fluid connection with said crystallizer at a location above said collector section thereof.

7. An aluminum-air power cell comprising:
a cell stack through which electrolyte is circulated,
an electrolyte storage tank,
means for circulating electrolyte from said storage tank, through said cell stack, and back to said storage tank,
means for directing air through said cell stack,
means for removing hydragillite from said electrolyte, said removing means including a lamella settler crystallizer having a longitudingly extending axis positioned at an angle with respect to horizontal, and
means for directing electrolyte through said crystallizer.

8. The power cell of claim 7, wherein said removing means additionally include a lamella settler having a longitudingly extending axis positioned at an angle with respect to horizontal and operatively connected to said crystallizer, and means for directing electrolyte through said settler.

9. The power cell of claim 8, wherein said removing means additionally includes a conveyor mechanism operatively connected to said lamella settler.

10. The power cell of claim 9, wherein said removing means additionally includes washing means and storage means operatively connected to said conveyor mechanism.

11. The power cell of claim 8, wherein said crystallizer has a lower end section connected to receive electrolyte from said elecrolyte storage tank, and wherein said lamella settler has a lower end section connected to receive electrolyte from said lower end section of said crystallizer.

* * * * *